US008418511B2

(12) United States Patent
Kim et al.

(10) Patent No.: US 8,418,511 B2
(45) Date of Patent: Apr. 16, 2013

(54) DRAIN STRUCTURE FOR LAUNDRY TREATING DEVICE

(75) Inventors: Sung Ryong Kim, Seoul (KR); Ki Chul Woo, Seoul (KR); Dong Soo Lee, Seoul (KR); Dong Won Kim, Seoul (KR); Sung Min Kim, Seoul (KR); Na Eun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 633 days.

(21) Appl. No.: 12/252,985

(22) Filed: Oct. 16, 2008

(65) Prior Publication Data

US 2009/0158784 A1 Jun. 25, 2009

(30) Foreign Application Priority Data

Nov. 27, 2007 (KR) .................. 10-2007-0121645

(51) Int. Cl.
*D06F 31/00* (2006.01)
*D06F 37/00* (2006.01)
*D06F 39/00* (2006.01)

(52) U.S. Cl.
USPC ...................... 68/27; 68/9; 68/208

(58) Field of Classification Search .......... 68/27, 9, 68/208
See application file for complete search history.

(56) References Cited

U.S. PATENT DOCUMENTS

| 3,805,404 | A * | 4/1974 | Gould | 34/75 |
| 6,618,887 | B2 * | 9/2003 | Kim et al. | 8/158 |
| 2006/0156765 | A1 * | 7/2006 | Sunshine et al. | 68/13 R |
| 2007/0119216 | A1 * | 5/2007 | Jeong et al. | 68/3 R |
| 2010/0064736 | A1 * | 3/2010 | Jeong et al. | 68/13 R |

FOREIGN PATENT DOCUMENTS

| GB | 820385 | | 9/1959 |
| GB | 990098 | | 4/1965 |
| GB | 1510528 | A * | 5/1978 |
| JP | 10-015276 | A | 1/1998 |
| JP | 10085480 | A * | 4/1998 |
| KR | 10-2001-0065084 | | 7/2001 |
| RU | 2 057 223 | | 3/1996 |
| RU | 2 067 634 | | 10/1996 |
| SU | 170457 | | 4/1965 |
| SU | 1118729 | | 10/1984 |
| TR | 2003/00569 | | 12/2004 |
| UA | 57799 | | 7/2003 |
| UA | 65749 | | 4/2004 |
| WO | WO 02/12609 | | 2/2002 |
| WO | WO 0212609 | A1 * | 2/2002 |
| WO | WO 2008/084932 | | 7/2008 |
| WO | WO2008/084932 | A2 | 7/2008 |

OTHER PUBLICATIONS

Australian Office Action dated Mar. 3, 2011. (Application No. 2008330399).
European Search Report dated Mar. 23, 2009.

(Continued)

*Primary Examiner* — Michael Barr
*Assistant Examiner* — Charles W Kling
(74) *Attorney, Agent, or Firm* — KED & Associates LLP (57) ABSTRACT

A laundry machine includes a first laundry treating device, and a second laundry treating device arranged adjacent to the first laundry treating device. The second laundry treating device is operable independently of the first laundry treating device. A first draining pipe guides water discharged from the first laundry treating device, and a second draining pipe guides water discharged from the second laundry treating device. A joining pipe is connected to the first and second draining pipes at a joining point.

22 Claims, 7 Drawing Sheets

OTHER PUBLICATIONS

International Search Report and Written Opinion dated Sep. 14, 2010 (Application No. PCT/KR2008/006749).
Russian Office Action dated Aug. 24, 2011.
Chinese Office Action dated May 4, 2012 issued in Application No. 2008-80121904 (with English translation).
Russian Office Action dated Nov. 25, 2011.

* cited by examiner

DRAIN STRUCTURE FOR LAUNDRY TREATING DEVICE

BACKGROUND

1. Field

The present disclosure relates to a laundry treating device capable of washing or drying laundry.

2. Background

A washing machine, which is a typical laundry treating device, performs washing, rinsing, and spin-drying operations, in order to remove contaminants attached to laundry using interaction of detergent and water. A drying machine, which is another typical laundry treating device, is a home appliance for drying wet clothes, etc. Recently, a home appliance having a combined function of a washing machine and a drying machine has widely been used.

Generally, such laundry treating devices are classified into a top loading type and a front loading type in accordance with the laundry loading position. Typically, a laundry treating device is directly installed on a wood, cement, or tile floor. In the case of a front loading type laundry treating device, it is inconvenient for the user to load and unload laundry because the position of the loading/unloading opening of the device is low.

Generally, only one large-capacity washing machine is installed in a home. When one desires to wash different kinds of laundry in different loads using the washing machine, it is necessary to operate the washing machine several times. For example, when one desires to wash laundry such as adult clothes and laundry such as underclothes or baby clothes in different loads, the washing machine operates two times to individually wash the two different kinds of laundry. For this reason, the washing time increases, and consumption of water, detergent and energy also increases.

Furthermore, it is undesirable to use a large-capacity washing machine to wash a small amount of laundry, in terms of saving of energy. This is because the washing course set in a large-capacity washing machine is optimized for larger loads, and the amount of water consumed in the washing course is large. Also, a large amount of electricity is consumed because it is necessary to rotate a large-size drum or pulsator.

Also, the washing course set in a large-capacity washing machine is typical for general clothes. For this reason, the large-capacity washing machine may be unsuitable for the washing of delicate clothes, such as underclothes or baby clothes. In addition, the large-capacity washing machine is unsuitable when one desires to wash a small amount of laundry on a frequent basis. Generally, users collect laundry for several days, in order to wash the collected laundry at one time. However, leaving laundry, in particular, underclothes or baby clothes, without immediately washing them, is undesirable in terms of cleanliness. Furthermore, when such clothes are left for a long period of time, there is a problem in that they cannot be cleanly washed. because dirt may be fixed to the clothes.

In this regard, the necessity of a small-size washing machine having a capacity much smaller than the conventional large-capacity washing machine has increased. However, where two small-size washing machines are installed in a home, there are problems associated with space utility, even though the size of the washing machines is small.

BRIEF DESCRIPTION OF THE DRAWINGS

The embodiments will be described in detail with reference to the following drawings in which like reference numerals refer to like elements, and wherein.

DETAILED DESCRIPTION

Reference will now be made in detail to preferred embodiments of the present invention, examples of which are illustrated in the accompanying drawings.

Figure 1:
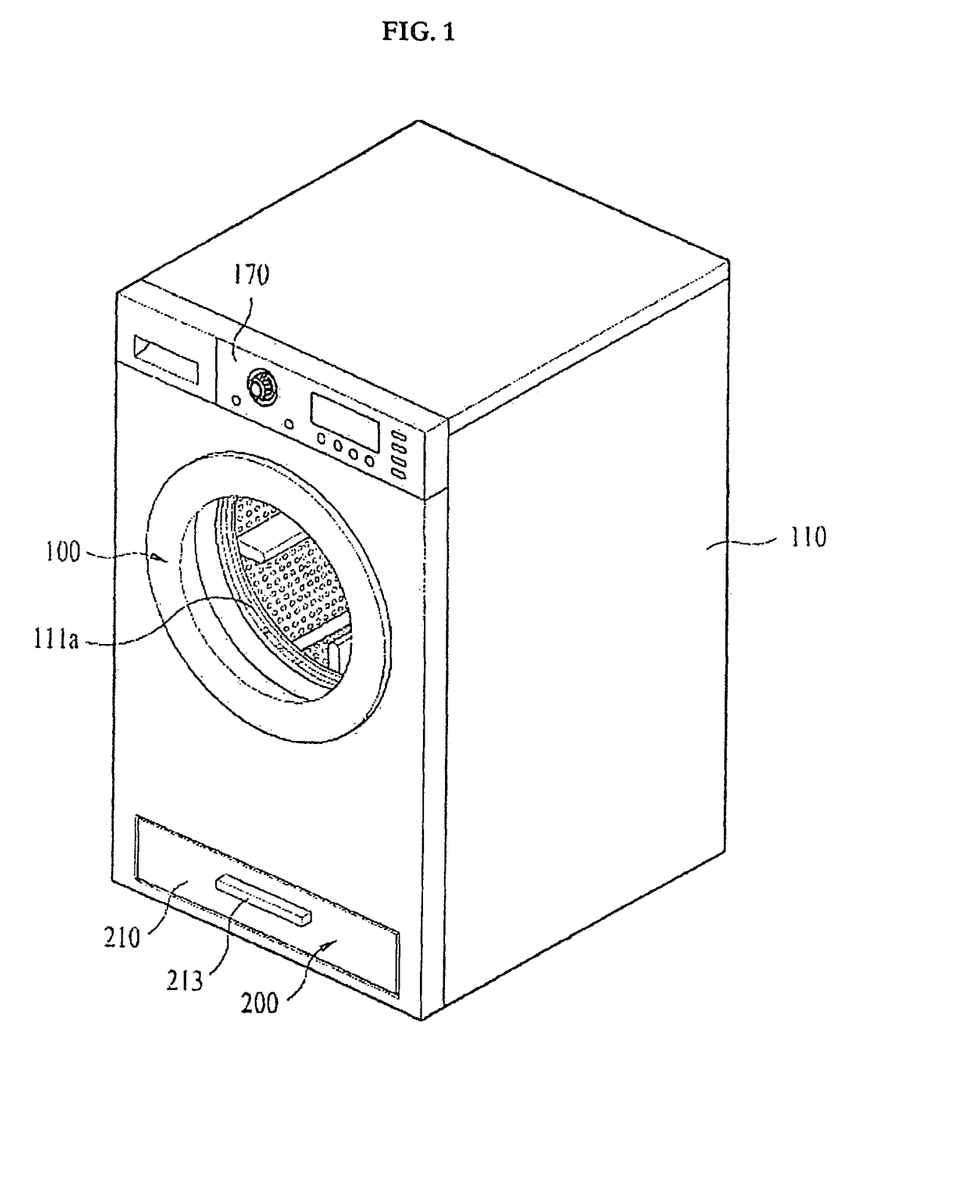
FIG. 1 is a perspective view illustrating a first embodiment of a laundry treating device.
Figure 2:
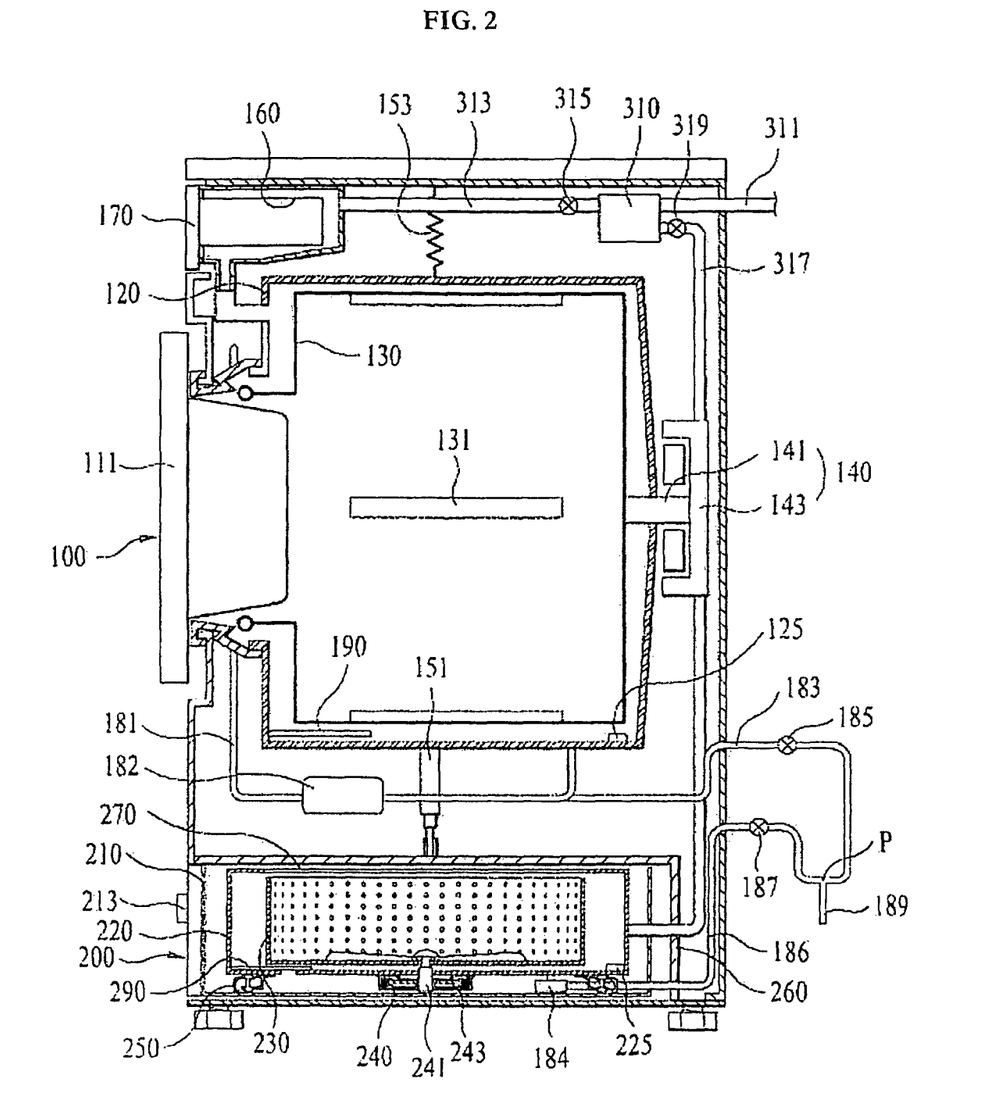
FIG. 2 is a sectional view of the laundry treating device shown in FIG. 1.

A first embodiment of a laundry treating device will be described with reference to FIGS. 1 and 2.

The laundry treating device includes a cabinet 110 constituting an outer structure of the laundry treating device. A first laundry treating device 100 is installed in the cabinet 110, and a second laundry treating device 200 is installed in the cabinet 110 in the vicinity of the first laundry treating device 100. The second laundry treating device 200 can operate independently of the first laundry treating device 100.

A control panel 170 is arranged at the front side of the cabinet 110, to control both the first and second laundry treating devices. At the front side of the cabinet 110 is a first door 111, which is part of the first laundry treating device 100. A front wall of the second laundry treating device 200 is also arranged on the front side of the cabinet 110.

The first laundry treating device 100 includes a first washing tub 120, a first drum 130 rotatably installed in the first washing tub 120, and a first driver 140 to drive the first drum 130. The first door 111, which is also included in the first laundry treating device 100, functions to open or close the first drum 130.

The top of the first washing tub 120 is connected to the cabinet 110 by a suspension element 153. The bottom of the first washing tub 120 is connected to a mover housing 260 by a first damper 151. Of course, the first washing tub 120 may be formed integrally with the cabinet 110.

The central rotating axis of the first drum 130 is substantially parallel with a floor on which the laundry treating device is installed. The first drum 130 has an opening 111a open toward the front side of the cabinet 110.

A plurality of lifts, which operate to wash laundry, are arranged on an inner surface of the First drum 130. As the drum 130 rotates, the lifts 131 raise laundry contained in the first drum 130, and then let the raised laundry fall, to cause frictional forces and impact forces to be applied to the laundry.

The first driver 140 includes a first drive shaft 141 connected to the first drum 130, and a first motor 143 to rotate the first drive shaft 141. The first driver 140 supports the first washing tub 120 at the rear side of the first washing tub 120, while rotating the first drum 130.

The first door 111 is hinged to the cabinet 110 at the front side of the cabinet 110. The central portion of the first door 111 is configured to allow the user to view the interior of the first drum 130.

The second laundry treating device 200 includes, in addition to the case 210, a second washing tub 220 installed in the case 210. A second drum 230 is rotatably installed in the second washing tub 220. A second driver 240 drives the second drum 230. A second door 270 opens or closes the second drum 230.

The second laundry treating device 200 is received in a mover housing 260, which is arranged beneath the first laundry treating device 100. The second laundry treating device 200 can be slid into and out of the cabinet 110. A handle 213 is provided at the front side of the second laundry treating device 200, to allow the user to move the second laundry treating device 200. The case 210 can slide along the mover housing 260. The second washing tub 220 is received in the case 210. The second washing tub 220 is coupled to the bottom of the case 210 inside the case 210 by a second damper 250.

The central rotating axis of the second drum 230 is perpendicular to the floor. The second drum 230 has an opening (not shown) formed through the top of the second drum 230. Accordingly, the second door 270 is installed at the top of the second drum 230. Thus, the second laundry treating device 200 is of a top loading type.

The second driver 240 includes a second drive shaft 241 connected to the second drum 230, and a second motor 243 to rotate. the second drive shaft 241. The second driver 240 supports the second washing tub 220 at the. bottom of the second washing tub 220, while rotating the second drum 230.

The laundry treating devices further include a first heater 190 in the first laundry treating device and a second heater 290 in the second laundry treating device. The heaters heat water supplied to the first washing tub 120 and the second washing tub 220. The first heater 190 is installed in the first washing tub 120, whereas the second heater 290 is installed in the second washing tub 220. In some embodiments, the first and second heaters 190 and 290 operate alternately under the control of a controller. For example, the second heater 290 does not operate during the operation of the first heater 190. Similarly, the first heater 190 does not operate during the operation of the second heater 290. This prevents the heaters from drawing too much electricity all at once.

The laundry treating device further includes a water supply unit to supply water to the laundry treating devices. The water supply unit includes an external connecting pipe 311 connected to an external water supply source, a water tank 310 to store water supplied through the external connecting pipe 311, a first water supply pipe 313 to guide water from the water tank 310 to the first washing tub 120, and a second water supply pipe 317 to guide water from the water tank 310 to the second washing tub 220. The water supply unit may also include a first water supply control valve 315 arranged in the first water supply pipe 313, to control the amount of water supplied to the first washing tub 120, and a second water supply control valve 319 arranged in the second water supply pipe 317, to control the amount of water supplied to the second washing tub 220.

In some embodiments, the first water supply pipe 313 may lead directly into the tub 120 of the first laundry treating device. In other embodiments, the first water supply pipe 313 may be connected at one end thereof to the water tank 310, and at the other end thereof to a first detergent box 160. As a result, water, which is guided through the first water supply pipe 313, is supplied to the first washing tub 120 after passing through the first detergent box 160.

Similarly, the second water supply pipe 317 may be connected, at one end thereof, to the water tank 310, and may be connected, at the other end thereof, to a second detergent box (not shown). As a result, water, which is guided through the second water supply pipe 317, may be supplied to the second washing tub 220 after passing through a second detergent box.

Alternatively, in still other embodiments, a single detergent box may be installed. In this case, either or both the first water supply pipe 313 and the second water supply pipe 317 may be connected at one end thereof to the water tank 310, and at the other end thereof to the single detergent box. Accordingly, when water is supplied to the first washing tub 120, or the second washing tub 220, water from the water tank 310 always passes through the detergent box.

The end of each water supply line connected to the water tank may be arranged at a level higher than the other end of the line connected to the first and second washing tubs. In this case, water emerging from the water tank can be naturally introduced into the first and second washing tubs in accordance with the water head difference between the opposite ends of the line, without using a pump.

A first temperature sensor 125 may be arranged in the first washing tub 120 to measure the temperature of water in the first washing tub 120. A second temperature sensor 225 may be arranged in the second washing tub 220 to measure the temperature of water in the second washing tub 220.

A first draining pipe 183 and a first circulating pipe 181 are arranged in the cabinet 110. The first draining pipe 183 functions to drain water from the first washing tub 120. The first circulating pipe 181 functions to reintroduce water discharged from the first washing tub 120 back into the First washing tub 120.

A first draining pump 182 is arranged at a branching point of the first draining pipe 183 and First circulating pipe 181, to outwardly drain or circulate water emerging from the first washing tub 120.

A second draining pipe 186 is arranged in the cabinet 110, to drain water from the second laundry treating device 200. A second draining pump 184 is arranged in the second draining pipe 186, to outwardly drain water emerging from the second draining pipe 186. The first and second draining pumps 182 and 184 are independently controlled by a controller.

A joining pipe 189 is arranged at a joining point P of the first and second draining pipes 183 and 186 such that the joining pipe 189 is connected to the first and second draining pipes 183 and 186. The joining pipe 189 functions to prevent water drained through the first and second draining pipes 183 and 186 from flowing backwards in a direction opposite to the draining direction due to a water head difference between the first and second draining pipes 183 and 186.

The first and second draining pipes 183 and 186 are arranged such that certain portions thereof are positioned at levels higher than the joining point P. When at least a portion of each of the first and second draining pipes 183 and 186 is positioned at a level higher than the joining point P, it is possible to prevent water from entering the first or second draining pipe 183 or 186 from one of the other draining pipes at the joining point P.

In at least one of the first and second draining pipes 183 and 186, a check valve may be arranged to prevent water from flowing backwards. In the embodiment shown in FIG. 2, check valves 185 and 187 are arranged in the first and second draining pipes 183 and 186, respectively.

Preferably, each of the first and second draining pipes 183 and 186 has a portion positioned at a level equal to or higher than the joining point P in a region upstream from the end of the associated first or second draining pipe 183 or 186. This is because, when one of the first and second draining pipes 183 and 186 does not include a portion positioned at a level equal to or higher than the joining point P in a region upstream from the end of the associated first or second draining pipe 183 or 186, water may flow from the joining point P to the associated first or second draining pipe 183 or 186 positioned at a level lower than the joining point P.

Figure 3:
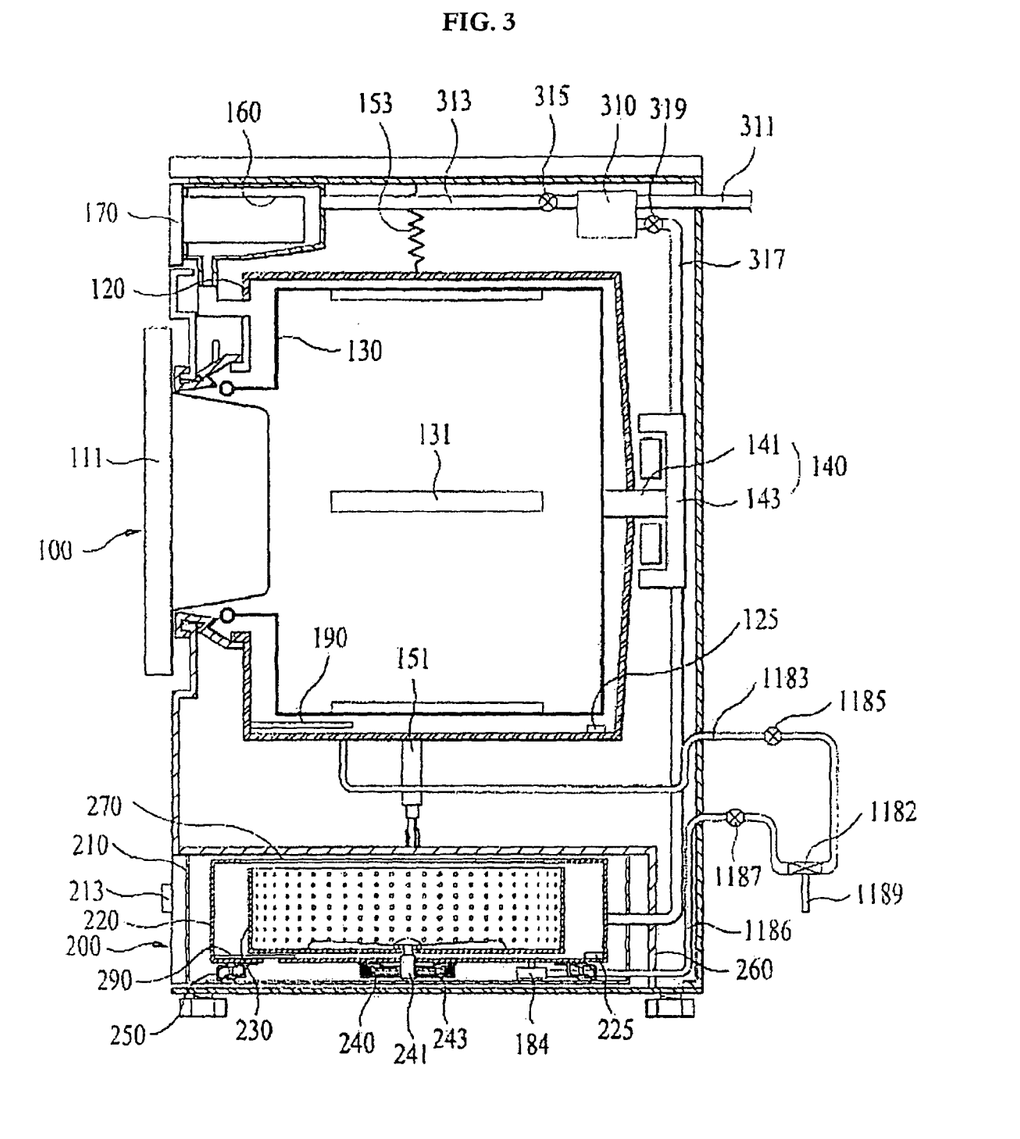
FIG. 3 is a sectional view illustrating another embodiment of a laundry treating device.

Another embodiment of the laundry treating device according to the present invention will be described with reference to FIG. 3. In the following description, no detailed description will be given of the same constituent elements as those of the above-described embodiment.

In the laundry treating device according to this embodiment, a draining pump 1182 is arranged at the joining point between first and second draining pipes 1183 and 1186. In this case, the single draining pump 1182 is used to perform draining operations of both the first and second laundry treating devices.

First and second flow control valves 1185 and 1187 may be arranged in the first and second draining pipes 1183 and 1186, respectively, to control a flow of water. When the draining pump 1182 operates under the condition in which the first laundry treating device performs a draining operation, and the second laundry treating device performs a washing operation, the second flow control valve 1187 prevents water, which is used in the washing operation of the second laundry treating device, from being outwardly drained.

Check valves as described above may be arranged in the first and second draining pipes 1183 and 1186, respectively. Alternatively, when one of the draining pipes 1183 and 1186 does not include a portion positioned at a level higher than the joining point in a region upstream from the end of the associated draining pipe 1183 or 1186, a single check valve may be arranged in the associated draining pipe 1183 or 1186. A bi-directional valve, which communicates with both the first and second draining pipes 1183 and 1186, may be arranged at the joining point.

Figure 4:
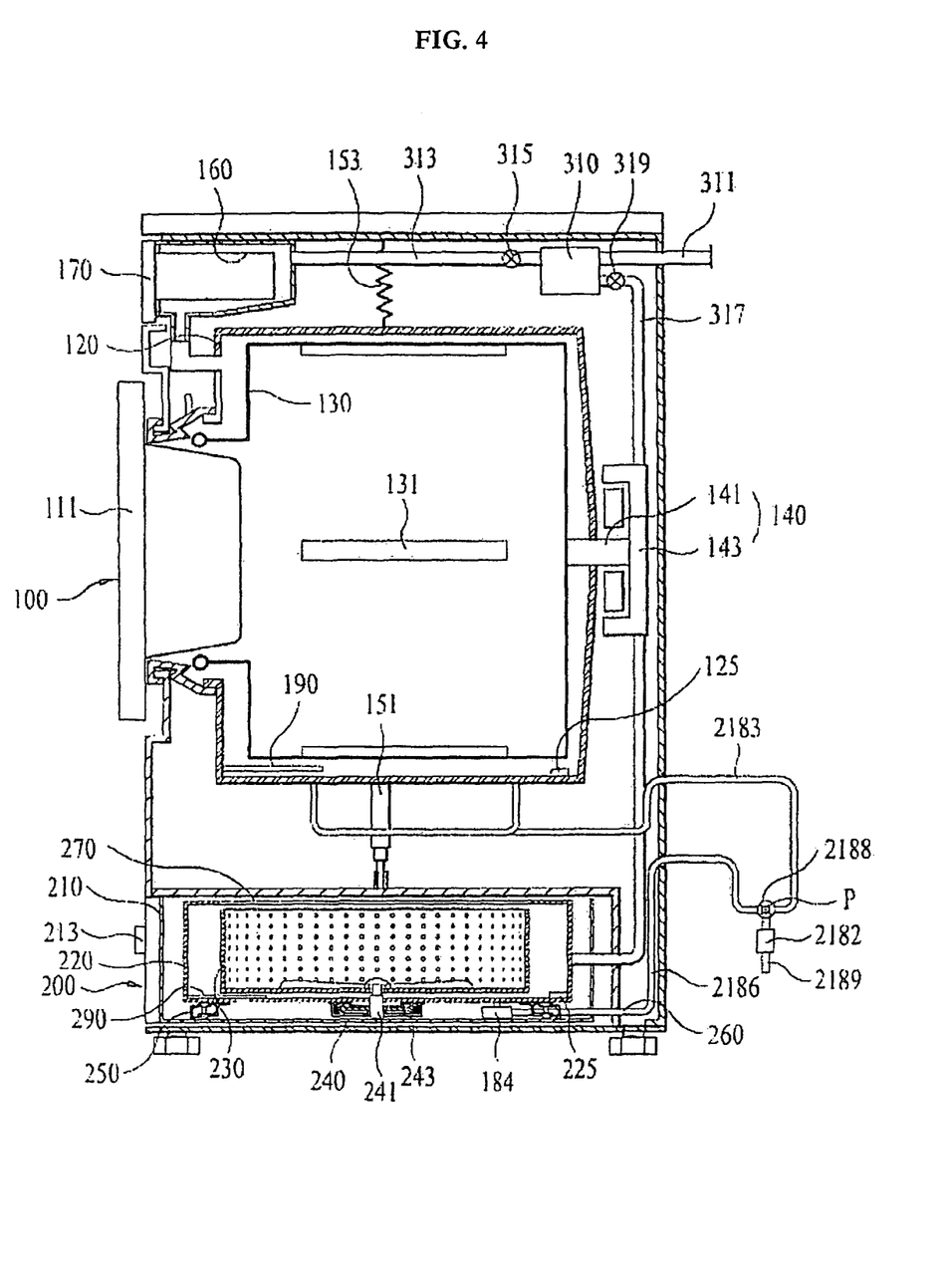
FIG. 4 is a sectional view illustrating another embodiment of a laundry treating device.

Another embodiment of the laundry treating device according to the present invention will be described with reference to FIG. 4. In the following description, no detailed description will be given of the same constituent elements as those of the above-described embodiment.

In the laundry treating device according to this embodiment, a draining pump 2182 is arranged in a joining pipe 2189 of first and second draining pipes 2183 and 2186 at a position downstream from a joining point P in a draining direction. A bi-directional valve 2188 may be arranged at the joining point P, to control a flow of water. Of course, flow control valves, which control a flow of water, may be arranged in the first and second draining pipes 2183 and 2186, respectively.

Hereinafter, various embodiments of the joining pipe included in the laundry treating device according to the present invention will be described.

Figure 5A:
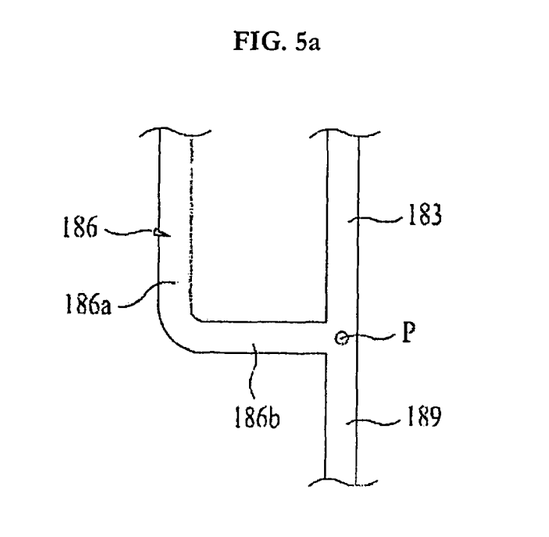
FIGS. 5a to 5c are views illustrating embodiments of a draining pipe structure for a laundry treating device.

Referring to FIG. 5A, the first draining pipe 183 extends straight in a vertical direction. The second draining pipe 186 includes a vertical portion 186a and a horizontal portion 186b. The horizontal portion 186b of the second draining pipe 186 is connected to the first draining pipe 183. The joining pipe 189 extends downwardly from an extension line of the first draining pipe 183.

Since the first and second draining pipes 183 and 186 are positioned at a level higher than the joining pipe 189 in this case, water present in the joining pipe 189 is prevented from flowing backwards into the first and second draining pipes 183 and 186.

Figure 5B:
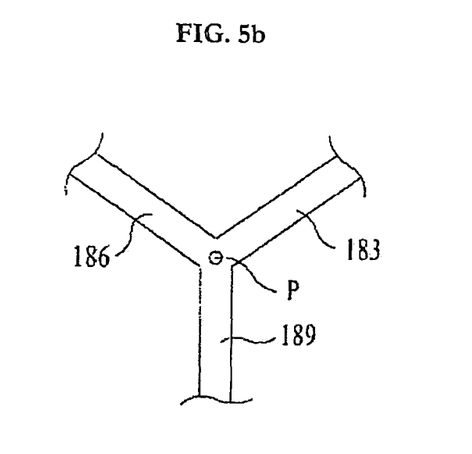

Referring to FIG. 5B, the first draining pipe 183, second draining pipe 186, and joining pipe 189 form a Y shape. Similarly to the embodiment shown in FIG. 5A, the first and second draining pipes 183 and 186 are positioned at a level higher than the joining pipe 189. Accordingly, water present in the joining pipe 189 is prevented from flowing backwards into the first and second draining pipes 183 and 186.

Figure 5C:
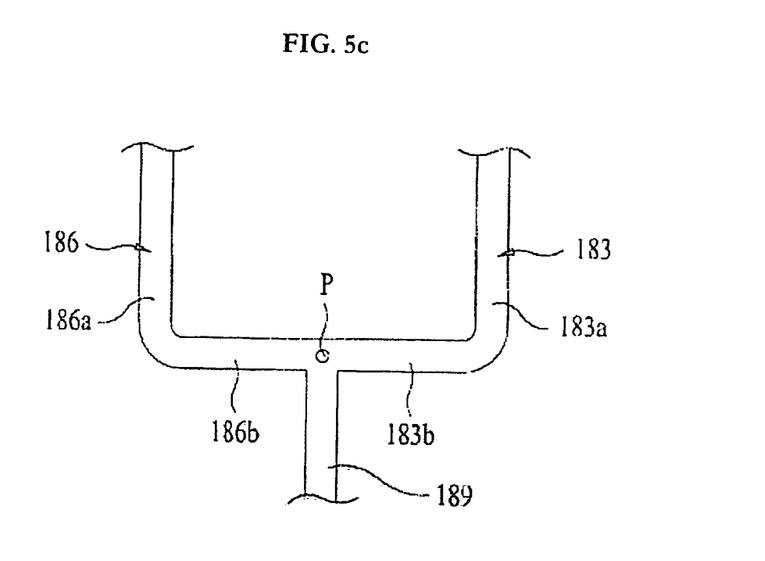

Referring to FIG. 5C, the first draining pipe 183 includes a vertical portion 183a and a horizontal portion 183b. The second draining pipe 186 includes a vertical portion 186a and a horizontal portion 186b. The horizontal portions 183b and 186b are joined to form a joining point P. A joining pipe 189 is connected to the first and second draining pipes 183 and 186 at the joining point P. The joining pipe 189 extends downwardly from the joining point P. Similarly to the embodiments shown in FIG. 5A or 5B, the first and second draining pipes 183 and 186 are positioned at a level higher than the joining pipe 189.

Figure 6:
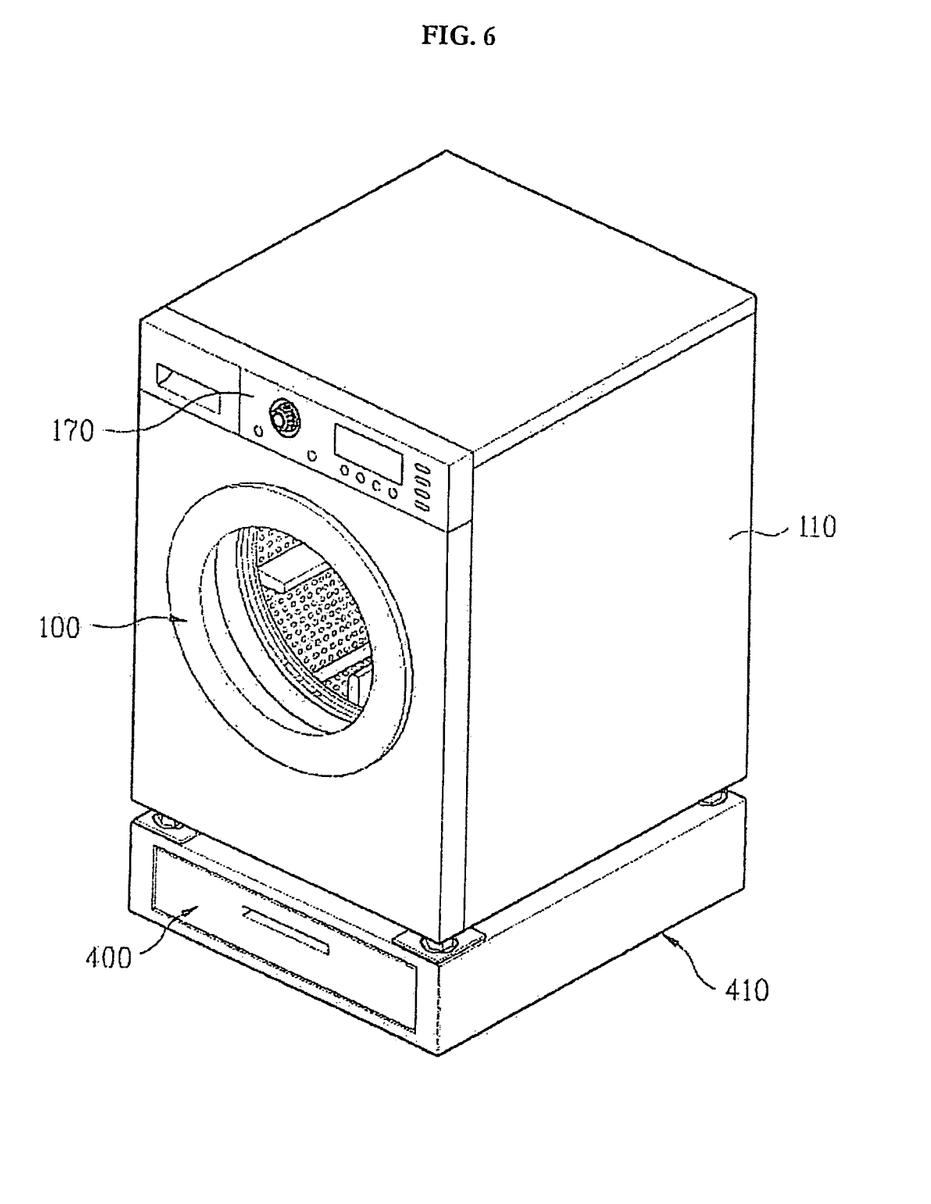
FIG. 6 is a perspective view showing another embodiment of a laundry treating device.

FIG. 6 illustrates another embodiment of a laundry treating device. In this embodiment, the first laundry treating device 100 is installed in the cabinet 110, namely, a first cabinet, whereas the second laundry treating device, which is designated by reference numeral 400 in FIG. 6, is installed in a second cabinet 410 forming a space independent of the first cabinet 110. The control panel 170, which controls both the first and second laundry treating devices, may be arranged at the front side of the first cabinet 110.

The procedure for supplying water to the first washing tub (not shown) included in the first laundry treating device 100 and the second washing tub (not shown) included in the second laundry treating device 400 is substantially identical to the above-described laundry treating device control method.

A laundry treating device and control method thereof as described above provide the following effects.

First, there is an advantage in that it is possible to simultaneously wash different kinds of laundry required to be independently washed, by simultaneously operating the first and second laundry treating devices.

Second, there is an advantage in that it is possible to secure cleanliness while reducing the consumption of electricity by selectively using different laundry treating devices in accordance with the amount and kind of laundry.

Third, there is an advantage in that it is possible to reduce the draining space because draining pipes included in respective laundry treating devices are connected to a single joining pipe. In particular, there is an advantage in that it is possible to prevent a backward flow of water from being generated in two draining pipes in a laundry treating device including at least two washing tubs by joining the draining pipes to a joining pipe, and positioning portions of the draining pipes at a level higher than the joining pipe.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although a number of embodiments have been described, it should be understood that numerous other modifications and embodiments can be devised by those skilled in the art that will fall within the spirit and scope of the principles of this disclosure. More particularly, variations and modifications are possible in the component parts and/or arrangements which would fail within. the scope of the disclosure, the drawings and the appended claims. In addition to variations and modifications in the component parts and/or arrangements, alternative uses will also be apparent to those skilled in the art.

What is claimed is:

1. A laundry treating machine, comprising:
a first laundry treating device including a first washing tub and a first drum rotatably installed in the first washing tub;
a second laundry treating device including a second washing tub and a second drum rotatably installed in the second washing tub, wherein the second laundry treating device is located below the first laundry treating device, and wherein the second laundry treating device operates independently of the first laundry treating device;
a first draining pipe that guides water discharged from the first washing tub of the first laundry treating device, wherein a portion of the first draining pipe is formed in a ∩-shape;
a second draining pipe that guides water discharged from the second washing tub of the second laundry treating device, wherein a portion of the second draining pipe is formed in a ∩-shape; and
a joining pipe that connects the first and second draining pipes at a joining point of the first and second draining pipes, wherein the joining point is located under a highest level of the ∩-shaped portion of the first draining pipe and a highest level of the ∩-shaped portion of the second draining pipe and the joining pipe is connected to a lower side of the joining point, and wherein end portions of the first draining pipe, the second draining pipe, and the joining pipe form a Y shape.

2. The laundry treating machine of claim 1, further comprising:
a first draining pump coupled to the first draining pipe; and
a second draining pump coupled to the second draining pipe.

3. The laundry treating machine of claim 2, wherein the first and second draining pumps are independently controlled.

4. The laundry treating machine of claim 1, further comprising a check valve arranged in at least one of the first draining pipe or the second draining pipe, wherein the check valve prevents a backward flow of water.

5. The laundry treating machine of claim 1, further comprising a draining pump arranged at the joining pipe of the first and second draining pipes.

6. The laundry treating machine of claim 5, further comprising a check valve arranged in at least one of the first draining pipe or the second draining pipe, wherein the check valve is positioned upstream of the joining point.

7. The laundry treating machine of claim 5, further comprising a bi-directional valve arranged at the joining point, wherein the bi-directional valve communicates with both the first and second draining pipes.

8. The laundry treating machine of claim 1, further comprising a draining pump arranged in the joining pipe at a position downstream from the joining point.

9. The laundry treating device of claim 8, further comprising a flow control valve arranged in at least one of the first draining pipe or the second draining pipe.

10. The laundry treating machine of claim 8, further comprising a bi-directional valve arranged at the joining point, wherein the bi-directional valve communicates with both the first and second draining pipes.

11. The laundry treating machine of claim 1, wherein each of the first laundry device and the second laundry device includes its own case.

12. The laundry treating machine of claim 11, wherein the case of the second laundry treating device is disposed within the case of the first laundry treating device.

13. The laundry treating machine of claim 11, wherein the case of the second laundry treating device is disposed below the first washing tub and the first drum of the first laundry treating device.

14. The laundry treating machine of claim 11, wherein the case of the first laundry treating device is disposed adjacent to and separate from the case of the second laundry treating device.

15. The laundry treating machine of claim 11, wherein the case of the first laundry treating device is disposed on top of the case of the second laundry treating device.

16. The laundry treating machine of claim 1, wherein a rotating axis of the second drum extends substantially perpendicular to a rotating axis of the first drum.

17. A laundry treating machine, comprising:
a first laundry treating device including a first washing tub and a first drum rotatably installed in the first washing tub;
a second laundry treating device including a second washing tub and a second drum rotatably installed in the second washing tub, wherein the second laundry treating device is located below the first laundry treating device, and wherein the second laundry treating device operates independently of the first laundry treating device;
a first draining pipe that guides water discharged from the first washing tub of the first laundry treating device, wherein a portion of the first draining pipe is formed in a ∩-shape;
a second draining pipe that guides water discharged from the second washing tub of the second laundry treating device, wherein a portion of the second draining pipe is formed in a ∩-shape; and
a joining pipe coupled to both the first and second draining pipes at a joining point, wherein the joining pipe receives the water flowing out of both of the first and second draining pipes, wherein the joining pipe is positioned relative to end portions of the first and second draining pipes such that the joining pipe prevents water draining from at least one of the first draining pipe or the second draining pipe from flowing backwards into the other of the first and second draining pipes, wherein the joining point is located under a highest level of the ∩-shaped portion of the first draining pipe and a highest level of the ∩-shaped portion of the second draining pipe and the joining pipe is connected to a lower side of the joining point, and wherein end portions of the first draining pipe, the second draining pipe, and the joining pipe form a Y shape.

18. The laundry treating machine of claim 17, further comprising:
a first check valve mounted in the first draining pipe; and
a second check valve mounted in the second draining pipe.

19. The laundry treating machine of claim 17, further comprising a draining pump that pumps water out of the second laundry treating device through the second draining pipe into the joining pipe, wherein an inlet of the joining pipe is located higher than a bottom of the second laundry treating device.

20. The laundry treating machine of claim 19, wherein an inlet of the joining pipe is located below a bottom of the first laundry treating device.

21. The laundry treating machine of claim 20, further comprising a check valve mounted in the second draining pipe, wherein the check valve prevents the water draining from the first laundry treating device from flowing backward into the second draining pipe.

22. The laundry treating machine of claim 21, wherein the draining pump is coupled to a portion of the second draining pipe that is located upstream of the joining point.

* * * * *